Dec. 26, 1944.   F. M. SMITH   2,365,781
SPAR STRUCTURE FOR AIRPLANE WINGS
Filed May 9, 1941   3 Sheets-Sheet 2

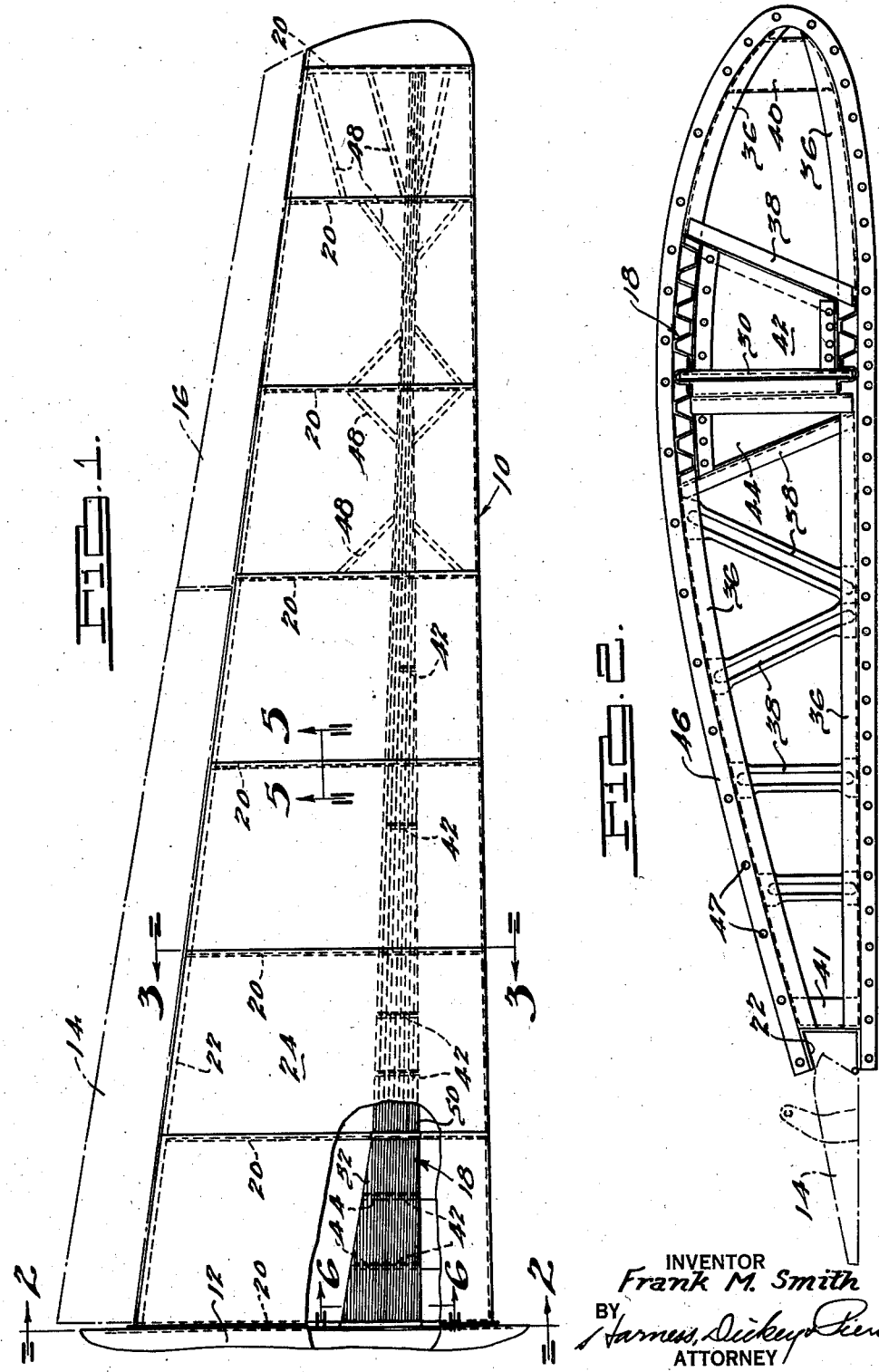

INVENTOR
Frank M. Smith
BY
ATTORNEY

Patented Dec. 26, 1944

2,365,781

UNITED STATES PATENT OFFICE 2,365,781

SPAR STRUCTURE FOR AIRPLANE WINGS

Frank M. Smith, Dearborn, Mich., assignor, by mesne assignments, to Consolidated Aircraft Corporation, San Diego, Calif.

Application May 9, 1941, Serial No. 392,679

7 Claims. (Cl. 189—37)

This invention relates to spar structures for airplane wings and particularly to one which although capable of being manufactured from any suitable material, is of particular advantage where the metal is of a type that is relatively hard to work such, for instance, as stainless steel.

Objects of the invention include the provision of a spar structure for airplane wings designed to give maximum strength for a minimum weight of metal; the provision of a spar structure for airplane wings that is constructed substantially entirely from sheet metal; the provision of a spar structure for airplane wings so constructed and arranged as to render it particularly easy to fabricate; and the provision of a spar structure for airplane wings that is simple in construction and economical to produce.

Other objects of the invention include the provision of a wing spar for airplanes including top and bottom flanges connected by one or more webs and in which both the flanges and webs are formed from sheet metal and are of a corrugated nature; the provision of an airplane wing spar comprising spaced flanges interconnected by one or more webs, the web or webs each having a cap portion more or less simulating a portion of the flanges, secured thereto and to the flanges; the provision of an airplane wing spar including vertically spaced flanges interconnected by a web in which the web is corrugated transversely of its length and the corrugated edges of which are received within an encompassing cap provided with integral outwardly directed flanges to which portions of the spar flanges are suitably secured; and the provision of an airplane wing spar including vertically spaced web portions formed from sheet metal and corrugated in the direction of their length together with a web interconnecting the flange portion and comprising a strip of corrugated sheet metal arranged with the corrugations transversely of its length and having its opposite edges encompassed by side walls of one corrugation of each of its corresponding flanges.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a partially broken plan view of an airplane wing assembly embodying features of the present invention, the flaps and ailerons being shown by dotted lines;

Fig. 2 is an enlarged end view of the wing shown in Fig. 1 taken as on the line 2—2 thereof;

Figure 3:
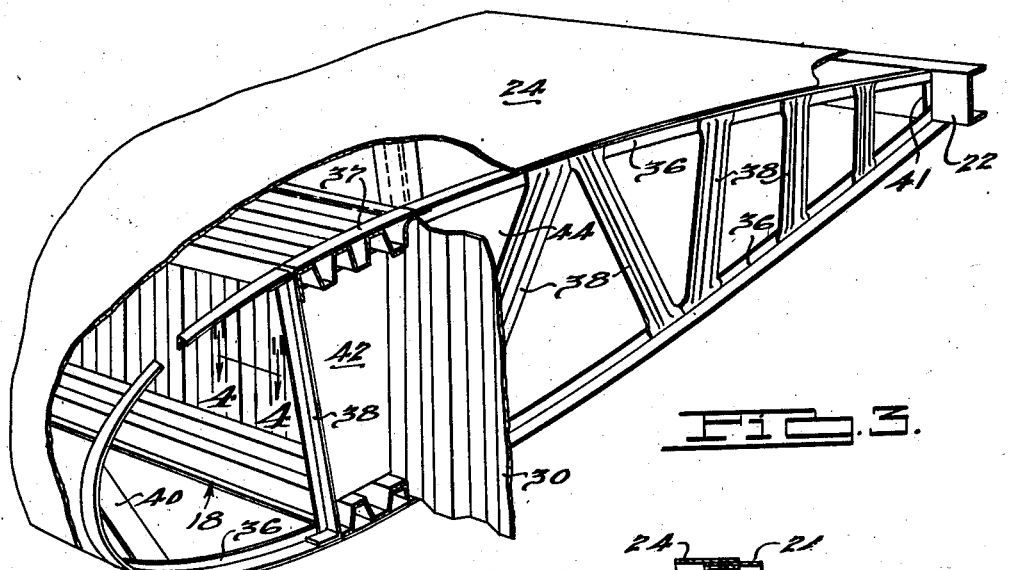
Fig. 3 is an enlarged partially broken, fragmentary perspective sectional view of the wing shown in the preceding views with the section taken substantially on the line 3—3 of Fig. 1.

The present invention particularly deals with an airplane wing construction and particularly to a spar structure therefor capable of being formed from stainless steel. It will be appreciated, of course, that being capable of being formed from stainless steel it is also capable of being formed from other metals such as other suitable steels, aluminum, or other light metals or alloys thereof, whereas it is not practical in most cases to form spar structures which are designed to be fabricated from aluminum or its alloys from stainless steel because of the greater weight of the latter and the greater difficulty in working stainless steel as compared to ordinary steels or any of the light metals usually employed for such purposes. In other words, while stainless steel may be readily bent by a simple bending operation it is highly resistant to drawing operations and the like involving stretching of the metal beyond its elastic limit, and particularly when in the form of the relatively thin sheets required in airplane structures such working of the metal is almost impossible under some conditions. Stainless steel being so much heavier than aluminum or its alloys it is required to be used in much thinner gauges than where aluminum or other alloys are employed and, therefore, requires different treatment in design in order to realize the maximum strength and rigidity in spite of the thin material. Designs can be produced to obtain such rigidity but I have found that while it is one problem to produce such a design it is a different problem, and usually more difficult, to fabricate such designs. It is, therefore, the principal object of the present invention not only to produce a design particularly suitable for fabrication by stainless steel and which is believed to be of a novel character in and of itself, but such a design that may be readily fabricated by the use of existing and readily available apparatus. The design itself and the features thereof which render it commercially practical from a fabrication standpoint will now be described in connection with the construction shown in the accompanying drawings.

It will be understood, of course, that while such structural elements may be produced by riveting the various separately formed elements together in accordance with the practices found in constructing such elements from any of the usual light alloys, one of the big advantages in using stainless steel or even ordinary steel, in addition to the corrosion resistance qualities of stainless steel, is that the riveting may be dispensed with and the various parts of the structure secured together by spot welding or the like, thus reducing the great expense and labor incident to the use of riveted structures.

Referring now to the accompanying drawings and particularly to Fig. 1 the rigid portion of an airplane wing is illustrated generally at 10, it being understood that broadly, as far as the present invention is concerned, it is suitably constructed and arranged at one end in any approved manner for securement to an airplane fuselage such as indicated at 12. In the present case it is assumed that the rigid wing section 10 will be provided with a suitable or conventional flap 14 and aileron 16 mounted for pivotal movement along its trailing edge portion in a conventional manner and in accordance with conventional practice. The rigid wing section 10 which will hereinafter be referred to simply as the wing for purpose of simplicity in description is, in the particular embodiment shown, provided with a single main spar indicated generally at 18 extending substantially the full length thereof, a plurality of ribs illustrated generally in Fig. 1 at 20 extending transversely of the wing and spaced from each other longitudinally thereof in accordance with conventional practice, an angularly sectioned trailing edge member 22 which extends the full length of the wing, together with a metal skin or covering 24 completely enveloping the framework thus provided by the spars, ribs and trailing edge member. It will, of course, be recognized that suitable braces, brackets, or the like may also be incorporated in the structure.

Figure 4:
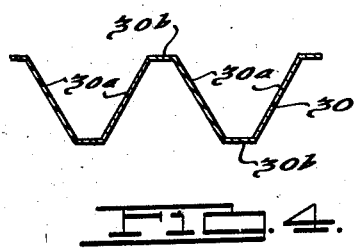
Fig. 4 is an enlarged, fragmentary horizontal view taken on the line 4—4 of Fig. 3 and illustrating the cross-sectional configuration of the web of the spar shown in Fig. 3.

The spar 18 includes a vertically directed web 30 extending continuously over the full length thereof joined at its upper and lower edges to correspondingly continuous top and bottom horizontally directed flanges. It is assumed in the present case that the spar 18 is constructed of relatively thin stainless steel and in order to obtain the desired rigidity therefrom the web 30 and its flanges are corrugated in the manner best illustrated in Fig. 4. As indicated in Fig. 4 the major number of the corrugations preferably have straight sides 30a arranged at an angle with respect to the general plane of the element together with relatively flat bottoms 30b lying substantially in the plane of the elements. The corrugations in the web 30 extend transversely of the length of the web 30, in other words vertically, while the corrugations in the flanges extend longitudinally of the spar as indicated.

The opposite, or top and bottom edges of the web 30 are received within one of the corrugations of each of the corresponding top and bottom spar flanges and suitably secured therein. In the particular spar construction shown the web 30 is received within the inwardly opening corrugation along one edge of the spar flanges for the entire length of the spar except that portion extending between the last two rib 20 at the inner end of the wing, at which point the top flange of the spar is gradually widened toward the inner end of the wing as illustrated in Fig. 1. In order to reduce the weight of the spar as much as possible the width of the spar flanges is reduced toward the tip of the wing by an amount approximately corresponding to the reduction in strength required in the spar in the direction of the tip. It will be appreciated that inasmuch as the web 30 is received in the corrugations along one edge of the top and bottom flanges the reduction in width of the spar is accomplished by cutting away those sides of the flanges most remote from the web 30.

The ribs 20 as best brought out in Figs. 2 and 3 comprise angularly sectioned elements 36 curved to conform to the cross-sectional contour of the wing and arranged with one flange parallel to the surface of the wing and the remaining flange projecting inwardly therefrom. The elements 36 at their inner ends abut the corresponding spar flanges and are suitably secured thereto and those elements 36 to the rear of the spar extend rearwardly to and are secured to the trailing edge member 22. The elements 36 forwardly of the spar are preferably formed as a single piece and the inwardly directed flange cut-away over the leading edge portion of the wing so as to permit the relatively sharp bend required at this point to be accomplished. Flat strips 37 extending over the outer face of the spar in line with each rib serve, in effect, to continue the outer flanges of the elements 36 over the outer faces of the spar flanges. Suitably directed struts 38 are interposed between the upper and lower elements 36 and are rigidly secured thereto so as to impart the necessary rigidity to the rib structure, and plates 40 and 41 are extended between the top and bottom elements 36 in the leading edge portion and trailing edge portion, respectively, of the wing to provide the necessary rigidity at these points. Gussets or bulkheads 42 are preferably interposed between the top and bottom flanges of the spar from the web 30 outwardly to the next adjacent strut 38 forwardly therefrom and which strut preferably extends between the forward edges of the top and bottom flanges of the spar, at each rib, in order to further strengthen the various rib sections at their point of connection to the spar and to render the connection more rigid. A similar gusset or bulkhead 44 is preferably provided at the inner or root end of the wing and on the side of the web 30 opposite the corresponding gusset or bulkhead 42 as best illustrated in Fig. 2, and similar gussets or bulkheads 44 are preferably interposed between the top and bottom flanges of the spar intermediate the last two ribs at the inner end of the wing as indicated in Fig. 1.

Figure 5:
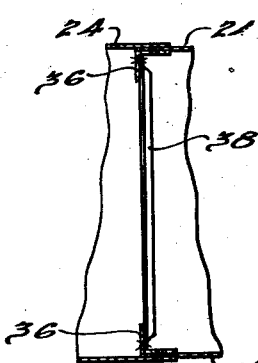
Fig. 5 is an enlarged fragmentary, sectional view taken on the line 5—5 of Fig. 1.

As indicated in Fig. 1 the skin or covering 24 is applied in widths equal to the spacing of the ribs 20 and preferably in lengths sufficient to cover both the upper and lower surfaces of the wing between each pair of ribs. In other words, one end of such sheet is applied to one face of the member 22 between a pair of ribs 20 and is then extended forwardly, over the leading edge portion of the wing and then brought back over the remaining face of the member 22 and secured thereto. As best brought out in Fig. 5 the side edges of such sheets overlap in line with each rib and the overlapped edges are welded together and to the horizontal flanges of the elements 36 in line with each rib.

While any suitable arrangement may be made for securing the wing 10 to the fuselage 12, the particular means provided in the construction shown in the drawings comprises an angularly sectioned member 46, best brought out in Fig. 2, which is welded or otherwise secured to the outer face of the wing 10 at its inner or root end, with the vertically directed flange thereof projecting outwardly and provided with a plurality of openings 47 through which securing means may be passed for securing the wing to the fuselage.

In addition to the gussets 42 and 44, the framework for the wing may be further stiffened if desired by providing one or more diagonal braces such as indicated at 48 in Fig. 1 between the spar and certain of the ribs 20 or between adjacent ribs as indicated, or otherwise arranged.

From the foregoing it will be appreciated that the spar structure comprising longitudinally corrugated upper and lower flange members interconnected by the intervening and vertically corrugated web 30 fixedly secured thereto, particularly when the skin or covering 24 is applied over the outer faces of the flange members and welded thereto, provides an extremely rigid and at the same time an exceptionally light spar structure. The securing of the skin over the flanged members of the spar and the securing of it to such flanged members creates a plurality of longitudinally extending box-sectioned elements in cooperation with the outwardly opening corrugations of these flange members. It will be appreciated that even in the absence of these box-sectioned elements thus formed the flanges themselves would be extremely rigid in the direction of their length and highly resistant to bending in a vertical direction and yet this is accomplished with a minimum amount of metal. Likewise the vertical corrugations in the web act to stiffen the web against bending and distortion and materially increases its ability to take compressive loads. By housing the opposite upper and lower edges in the corrugations of the flange members of the spar an extremely rigid connection between the web and the flanges of the spar is obtainable.

It will be appreciated by those skilled in the art, however, that if the top and bottom flange members of the spar described were made as single piece elements it would be extremely difficult if not commercially impossible to adequately secure the top and bottom edges of the web 30 to the flanged members of the spar for the reason that because of the corrugated nature of both the web and the flanges it would make it extremely difficult to introduce or so position tools to effect either riveting or welding of the opposite edges of the web 30 in the corresponding corrugations of the top and bottom flanges.

Figure 6:
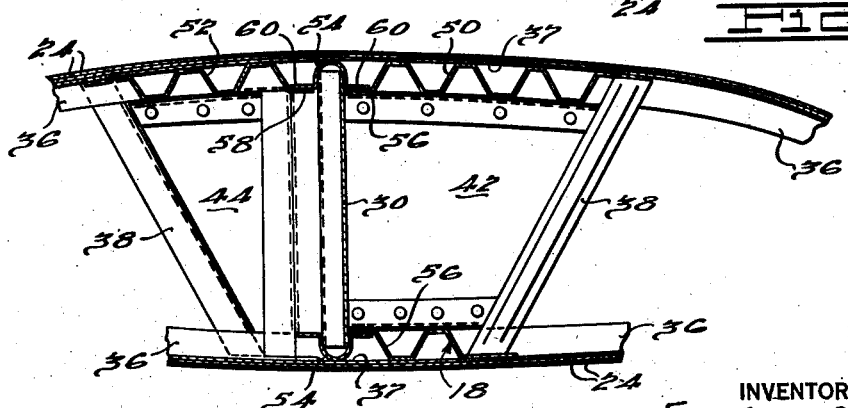
Fig. 6 is an enlarged fragmentary, sectional view taken on the line 6—6 of Fig. 1 to better illustrate the construction of the spar adjacent its inner end; and, Figs. 7, 8 and 9 are fragmentary, perspective views taken through a modified form of wing spar construction and illustrating the cross-sectional configuration of the same.

To obviate the above described difficulty in connection with the manufacture of the spar thus described and in accordance with a further feature of the present invention, the top and bottom flanges are not made from a single piece of material but instead are each made of separately formed pieces suitably secured together. This feature is probably best brought out in Fig. 6 from which it will be noted that the upper flange member which is here shown in section adjacent the inner or root end of the wing is formed of a part 50 disposed rearwardly of the web 30, a part 52 disposed forwardly of the web 30 and an intermediate connecting part 54 which itself forms the corrugation for receiving the corresponding edge of the web 30. The part 54 which, for the purpose of ease in description herein may be referred to as the cap, is preferably not formed with angularly related sides such as shown in Fig. 4, but preferably has parallel side portions spaced from one another by a distance sufficient to snugly receive the cooperating edge of the web 30 therein, thereby facilitating the welding, or riveting if employed, of the cap member 30 to the web. The outer portion of the cap 54 may be of a semi-cylindrical conformation as shown, or of any other suitable shape. The rear edge of the portion 50 is provided with a rearwardly directed flange 56 and the forward edge of the portion 52 is provided with an equivalent forwardly directed flange 58, while the part 54 is provided along both its forward and rearward edges with flanges or edge portions 60 which overlap the flanges 56 and 58, respectively, and are suitably secured thereto. As previously mentioned, while such parts may be secured together by means of riveting, where the various elements are formed of steel they may be more efficiently and economically secured together by spot welding which is preferred under such conditions.

The lower flange of the spar includes a cap 54 identical to the cap 54 first described but simply turned upside down with respect thereto which is secured to the web 30 in the manner first described, together with a corrugated portion 56 corresponding to the portion 50 previously described on the forward side of the web 30 and suitably secured thereto. The portion 56 is generally of less width than the portion 50 for the reason that it will be primarily subjected to tensile stresses in the direction of its length, whereas the portion 50 will be primarily subjected to compressive stresses. It will be appreciated that the portion 52 of the upper spar flange is that portion thereof which extends only between the two inner ribs as disclosed in Fig. 1.

With the above described construction, in the fabrication of the spar the cap members 54 are first separately applied over the corresponding edges of the web 30 over the full length thereof and are suitably secured thereto by riveting, welding or the like but preferably by welding where the elements are formed from steel or other readily weldable material. The spot welding of these parts may be readily accomplished inasmuch as because of the relatively small width of the flanges it suitable support may be provided internally of the corrugations of the web 30 within each cap member 54 and the exterior surfaces of the cap members 54 will be free and clear for the application of tools inasmuch as the portions 50 and 52 are not present at this stage of operation. After the cap members 54 are applied to web 30 and suitably secured in position thereon, then the members 50, 52 and 56 may each be applied in turn and their cooperating flanges riveted, welded or otherwise suitably secured together to complete this portion of the spar. The various rib structures may then be applied to the spar, the gussets 42 and 44 applied together with the trailing edge member 22 and then the covering 24 applied and secured in place to complete the wing structure except for such incidental brackets, etc. that may be added thereafter.

Figure 7:
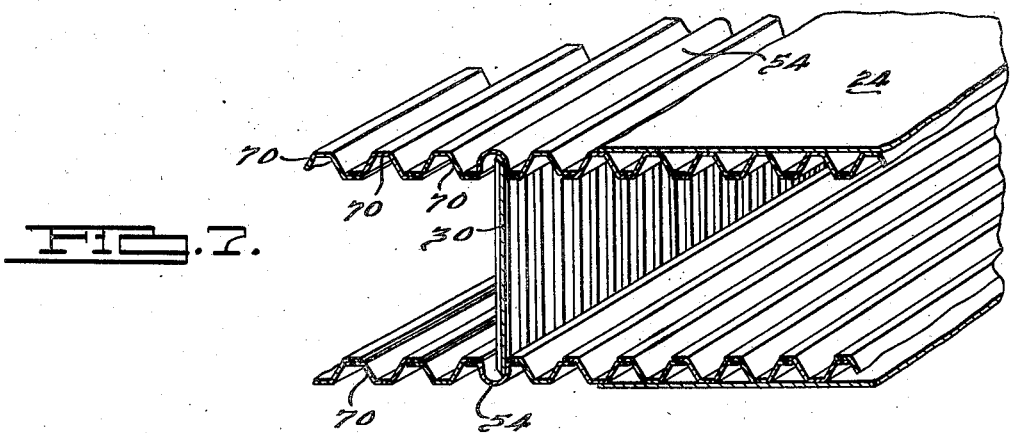

It will be appreciated from the foregoing that in the broader aspects of the invention it is not necessary that the flange portions of the spars on either side of the cap 54 be made from a single sheet of metal and that if desired these corrugated flange portions may be made up of separate strips, a suitable number of which may be secured together to form the desired width of flange. Such construction is illustrated in Fig. 7 in which it will be noted that the upper and lower flanges outwardly of the cap members 54 are made up of separate trough-shaped elements 70, arranged in inverted relation with respect to the respective outer faces of the wing and each provided with an outwardly directed flange along each side thereof. The members 70 on each side of the web 30 are arranged in side by side relationship with their adjacent flanges overlapped and suitably secured together as by welding or the like, and the inner flange of the innermost element 70 is, of course, arranged in overlapping relationship with respect to the adjacent flange of the cap member 54 and likewise is suitably secured thereto. By following out this method standard sections may be employed for forming spar flanges of any desired length and width and in such case instead of trimming off the outer edge of the flange on an angle as in the construction first described, the members 70 may be of successively shorter length from the webs 30 outwardly as suggested in Fig. 7, but aligned at the root of the wing, in order to realize the same effect. This construction also makes it easier to locate the web 30 at any desired point in the width of the spar.

Figure 8:
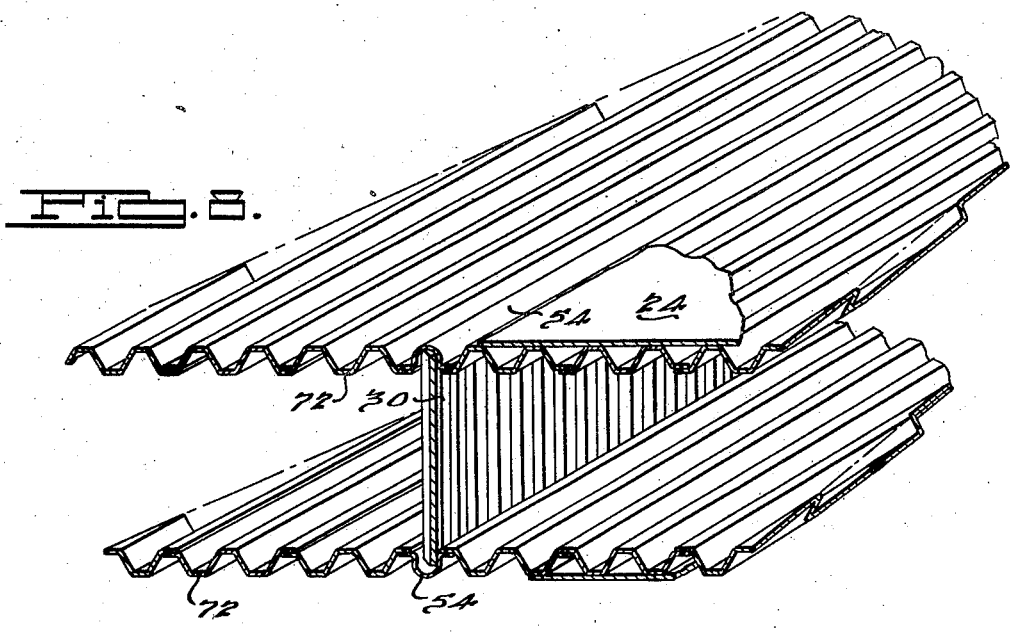

On the other hand, instead of making elements such as the elements 70 described in connection with Fig. 7 having a single corrugation only, such elements may be made up having two or more corrugations each and the same general procedure followed as in the manufacture of the spar. In other words, in Fig. 8 the web 30 and cap members 54 may be identical to those previously described and in the place of the element 70 described in connection with Fig. 7 elements 72, each formed to provide a pair of laterally spaced and inwardly opening channels, each having an outwardly directed flange along its opposite side edges, may be employed. The procedure of fabrication will, of course, be the same as in Fig. 7, that is, adjacent flanges of adjacent elements 72 may be overlapped and suitably secured together to obtain a spar flange of the desired width. To obtain the desired taper in width of the spar the same procedure as suggested in connection with Fig. 7 may be followed or the outer edges of the spar flanges may be tapered off as shown.

Figure 9:
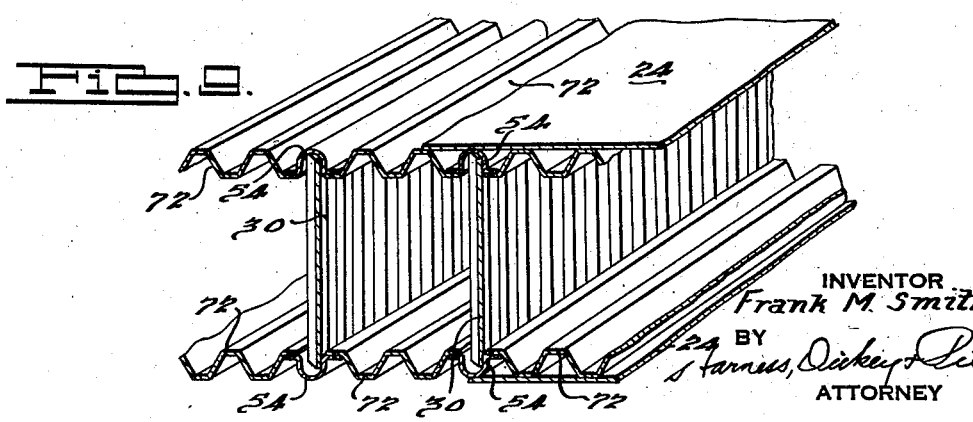

The above described construction is also readily adaptable to spars having box-sections as is sometimes desirable to obtain maximum stiffness. Such a construction is illustrated in Fig. 9. In such case two or more web members 30, each with its corresponding cap members 54 applied thereto may be arranged in spaced relation and connected together along their upper and lower edges by elements such as 72 which may be identical to the elements 72 shown and explained in connection with Fig. 8. Where desired additional elements 72 may be applied to the cap members 54 outwardly of the box section thus provided and as indicated in Fig. 9.

From the above it will be appreciated that in accordance with the present invention a spar structure is provided for airplane wings and the like that although fabricated from relatively thin sheet metal results in a construction having a maximum amount of strength for the weight of metal involved and that will be unusually rigid in service. It will further be appreciated that by the use of the specific constructions for the spar shown and described, they may be constructed from stainless steel or other metals difficult to work in a relatively simple, easy and economical manner.

Having thus described my invention, what I claim by Letters Patent is:

1. A spar structure for airplane wings comprising, in combination, a horizontally elongated vertically extending web formed from thin sheet metal and provided with corrugations extending transversely of its length, top and bottom flanges arranged with the general planes of their thicknesses transverse to the plane of thickness of said web extending longitudinally of said web and formed from relatively thin sheet metal and provided with corrugations extending in the direction of the length of said web, the upper and lower edges of said web being received within a corrugation of said top and bottom of said flanges, respectively, and being secured thereto.

2. A spar structure for airplane wings comprising, in combination, vertically spaced horizontally directed elongated flange elements arranged one over the other and generally parallel in elevational view and a similarly extending elongated web arranged with the plane of its thickness in an approximately vertical plane spacing said flange elements and fixed thereto, said flange elements being formed from relatively thin sheet metal and provided with corrugations extending in the direction of the length of said flange elements, said web being formed from relatively thin sheet metal and provided with corrugations extending transversely of its length, the corrugations of said web each having a flat portion in the plane of the corresponding side of said web, said web being engaged between parallel sides of a corrugation in each of said flanges with said flat portions in contact with said sides of said corrugations and fixed thereto.

3. A spar construction for airplane wings comprising, in combination, a horizontally elongated web corrugated over its length with the corrugations thereof extending transversely of its length, a cap member extending along each edge of said web embracing opposite sides thereof and fixed thereto, an outwardly directed flange on each of said cap members located inwardly of the corresponding edge of said web, and a separately formed spar flange member fixed to each of said flanges on said cap members and extending outwardly therefrom away from said web.

4. An airplane wing spar structure comprising, in combination, a pair of spaced flange members and a web member spacing said flange members and fixed thereto, said web member being formed of relatively thin sheet metal and having corrugations extending transversely of its length, and said flange members each including a cap member for said web, said cap members each being formed from a single piece of metal to provide an inwardly opening trough embracing opposite sides of said web along the corresponding edge thereof and outwardly directed edge portions along the open side of said trough, the remainder of said flange members being fixed respectively to corresponding edge portions on said cap members.

5. A spar structure for airplane wings comprising, in combination, a pair of elongated similarly extending spaced flange members having corrugations therein extending lengthwise thereof, an elongated web member arranged with its plane of thickness transverse to the planes of thickness of said flange members and extending in the same direction as said flange members spacing said flange members and fixed thereto and being corrugated transversely of its length, said web member being embraced at opposite edges thereof by the opposed walls of a corrugation of the corresponding flange member, and transversely extending plates interposed between said flanges at spaced points in the length of said spar and fixed to said flanges.

6. A spar structure for airplane wings or the like comprising, in combination, a pair of elongated transversely spaced web members each being formed from relatively thin sheet metal and bent to provide corrugations extending transversely of the length thereof, a trough-sectioned cap member extending along each upper and lower marginal edge of each of said web members in enveloping relation with respect to such marginal edge and fixed thereto, outwardly directed flanges along the open edge of each of said cap members, and longitudinally extending members bent to provide corrugations extending in the direction of the length thereof, spanning said cap members between corresponding marginal edges of said web member and fixed to said flanges thereon.

7. A spar structure for airplane wings or the like comprising, in combination, a pair of elongated transversely spaced web members each being formed from relatively thin sheet metal and bent to provide corrugations extending transversely of the length thereof, a trough-sectioned cap member extending along each upper and lower marginal edge of each of said web members in enveloping relation with respect to such marginal edge and fixed thereto, outwardly directed edge portions along the open edge of each of said cap members, longitudinally extending members bent to provide corrugations extending in the direction of the length thereof spanning said cap members between corresponding marginal edges of said web member and fixed to said edge portions thereon, and an additional longitudinally extending member arranged in approximately parallel relation to the first mentioned longitudinally extending members fixed to the edge portion of one of said cap members on that side thereof opposite to that to which one of said first mentioned longitudinally extending members is fixed.

FRANK M. SMITH.